Patented Sept. 19, 1933

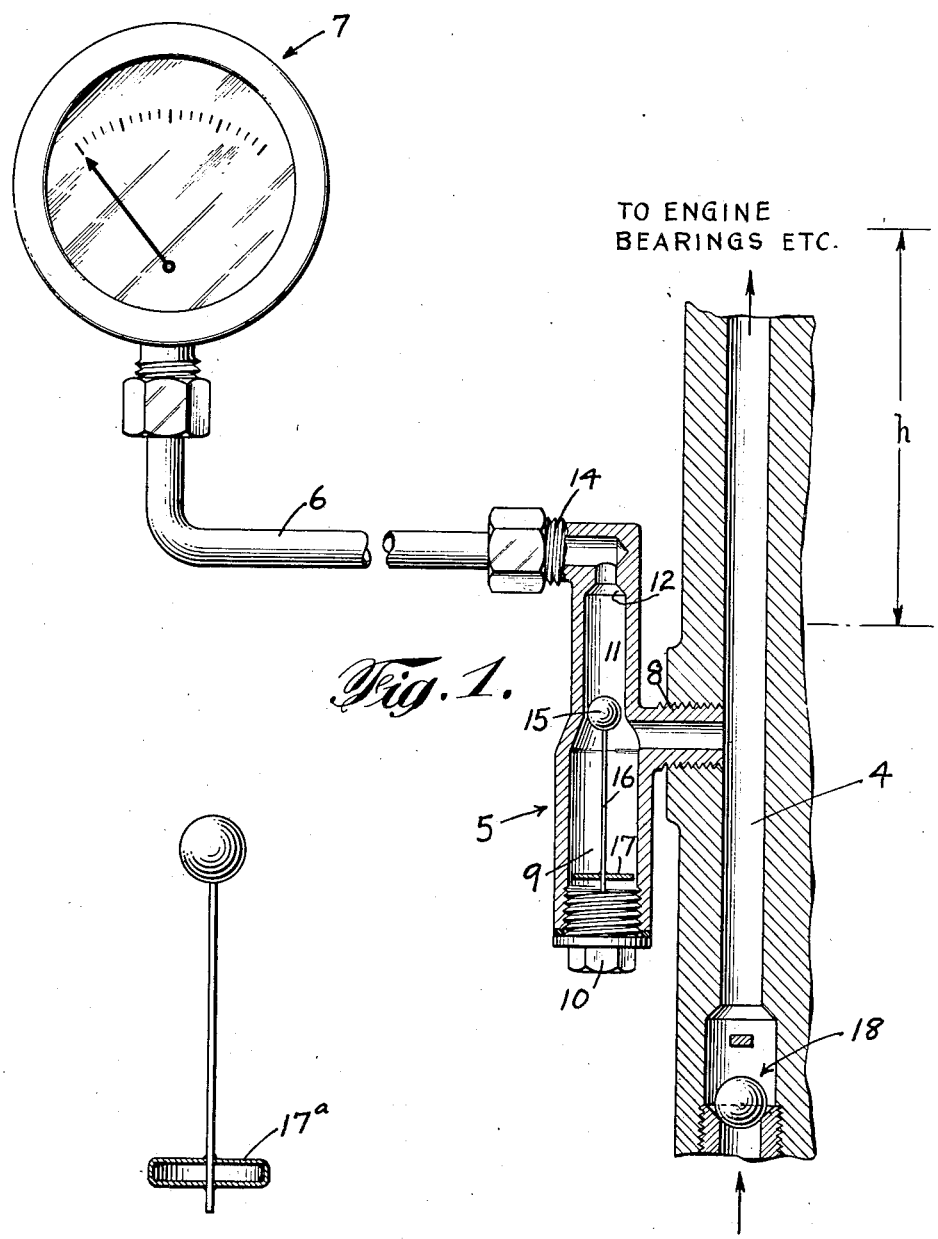

1,927,487

UNITED STATES PATENT OFFICE 1,927,487

FLUID PRESSURE APPARATUS

Charles F. Chisholm, Staten Island, N. Y.

Application February 12, 1931. Serial No. 515,315

13 Claims. (Cl. 184—1)

This invention relates to fluid pressure apparatus. It is disclosed as applied to an internal combustion engine for conserving the oil supply of an engine in the event of rupture or leakage of an oil line such as (for example) a line leading to a pressure gage.

Conventional internal combustion engines (e. g. automobile engines, airplane engines, etc.) are usually provided with an oil pump which operates whenever the engine is running to continuously pump oil for the lubrication of the various bearings, etc. To indicate the oil pressure it is common practice to provide a suitable pressure gage (e. g. a Bourdon gage) connected by a copper tube to a point in the discharge conduit of the oil pump. The gage is usually located at some distance from the oil pump, e. g. on the instrument panel of an automobile or airplane. This means that there is at least a few feet of copper tubing subject to breakage by engine vibration. When a break occurs (as it often does) the oil supply of the engine is promptly pumped out through the break and lost, unless the operator happens to immediately notice the drop in gage reading and shut down the engine. In actual practice the operator does not often notice the condition until it is too late; and in the case of an airplane, the operator is often unable to shut the engine down, even if he does notice that a break has occurred.

An object of the present invention is to provide apparatus for conserving the oil supply of an engine in the event of fracture of or leakage in an oil line.

Another object of the invention is to provide automatic means for repeatedly measuring the flow to a line and cutting off the line in the event that continued flow reaches a certain total volume.

A specific object of the invention is to provide a cut off valve responsive to total volume of continued flow and substantially non-responsive to rate of flow per se.

Other objects of the invention will be obvious from the disclosure herein. The form of the invention shown in the drawing is suitable for attachment to the present Model A Ford engine, but the same form of the invention is applicable to other engines. It will be obvious also that the invention is applicable to any engine and that in certain aspects it is applicable to other uses.

Fig. 1 of the drawing is a vertical section, partially in elevation, showing the invention more or less diagrammatically.

Fig. 2 is an elevation, partially in section, showing a modified form of moving part assembly for the cut off valve.

The engine is provided with the usual oil pump (indicated on the drawing by an arrow and the legend "From oil pump") which is built into the engine and operates whenever the engine is running to pump oil through a conduit 4 which may be formed in the cylinder block casting. A cut off valve designated as a whole by 5 is connected as shown to be in communication with the conduit 4. Conventional pipe or seamless tubing 6 leads from the valve 5 to a conventional pressure gage 7 which may be considered as mounted on the instrument panel of an automobile, airplane, or the like.

The cut off valve 5 comprises a generally cylindrical vertical casing connected to oil passage 4 by a nipple 8 which may be integral with the casing. In the lower part of the casing there is a cylindrical reservoir 9 closed by a plug 10 which may be provided as shown with a suitable gasket. Above the reservoir there is a tubular chamber 11 at the top of which is valve seat 12 over which oil may flow to a nipple 14 to which pipe 6 is connected in a conventional manner. In the lower portion of chamber 11 there is a movable valve element 15 (e. g. a ball) secured to the upper end of a wire or other filament 16. Secured near the lower end of filament 16 is a dash pot wafer 17 which may be a thin disc that is slightly smaller than a cross section of reservoir 9.

When the engine is not operating the pipe 6 and the gage 7 will ordinarily be empty. When the apparatus is first assembled, reservoir 9 will also be empty. As soon as the engine is started reservoir 9 fills with oil (if it be empty) and oil rushes through pipe 6 to the gage 7. The air in pipe 6 is compressible to a negligible volume, so on starting of the engine there is quite a flow to pipe 6. This flow pulls ball 15 with it, but wafer 17 retards the ball 15 so that it does not seat while the pipe 6 and gage 7 are being filled with oil. As soon as the pressure has been built up in the gage 7, the flow of oil through valve 5 ceases, and hence the ball 15 falls by gravity to its initial position.

Should a leak occur in pipe 6 oil will flow continuously through chamber 11, dragging ball 15 with it until the ball engages seat 12 and cuts off the flow. Pipe 6 being open to the atmosphere through the leak, gage 7 will drop to zero and the operator will be advised of trouble the next time he happens to look at the gage. In the mean time the oil supply will be conserved and the engine will continue to run in a normal manner. In fact no difficulty will be caused even if the operator should neglect to look at the gage for an indefinite period.

The valve 5 can be made as sensitive as desired by making the moving assembly very light and allowing small clearance between the ball 15 and the wall of chamber 11. At the same time false operation of the valve upon starting of the engine can be prevented by fitting wafer 17 close enough to the walls of the reservoir to prevent seating of the valve during the passage of a volume of oil equal to the oil receiving volume of pipe 6 and gage 7. The exact proportions, clearances, etc., are a matter of design for the particular installation. In actual practice I have obtained satisfactory results with dimensions and proportions approximately equal to those shown in Fig. 1 except for the thickness of wafer 17, which is exaggerated in the drawing for the sake of clearness. It will be obvious to those skilled in the art that various materials and various details of construction may be used. I have obtained satisfactory results with an aluminum ball pierced by a copper wire swaged in place, and with a very thin brass wafer soldered near the lower end of the wire. It is desirable to space the wafer from plug 10 to prevent the wafer from adhering to the plug.

It will be noted that it is very desirable for the cut off valve to be able to meet rather rigorous and seemingly contradictory requirements. Pipe 6 may develop a small leak which is not even sufficient to noticeably affect the operation of the pressure gage. If the valve is to function in such a case it must cut off on this small rate of flow; yet it must not cut off on the high rate of flow which exists for a short period each time the engine is started. By making the moving assembly very light and allowing small clearance between ball 15 and the wall of chamber 11, the valve can be made sufficiently sensitive to respond to substantially any rate of flow. On the other hand by making chamber 11 long enough and allowing small clearance at the edge of wafer 17 the valve is prevented from seating under the sudden flow upon starting of the engine.

It will be apparent that the valve is not responsive to rate of flow per se, but acts to integrate the flow and thus measure the total volume of continuous flow, and then cut off if this volume exceeds a certain figure. Of course, the cut off volume should be the oil receiving volume of pipe 6 and gage 7 plus a satisfactory safety factor against false operation. False operation is undesirable because if it happens often, the operator will soon cease to rely on his pressure gage; and it will be noted that once the valve seats it cannot be unseated without stopping the engine. With a properly designed valve false operation is exceedingly unlikely, because as soon as the pipe 6 and gage 7 have filled with oil, flow stops and hence valve 15 drops to its initial position. Thus the valve is automatically reset to starting position at each suspension of flow to conduit 6. Hence its measurement of total volume of flow is started afresh after each suspension of flow.

By using the construction shown in Fig. 2 the effective weight of the moving system of the valve can be made as near zero as desired with resultant increase in sensitivity of the valve to make it effective in case of very small leaks. The wafer 17$^a$ is made buoyant in any suitable manner as by making it hollow.

Should the operator shut down his engine without noticing that a leak had developed in pipe 6, the valve 15 might unseat which would cause a small loss of oil when the engine was next started. Means may be provided, however, to prevent even this small loss of oil. The discharge conduit of the pump may be fed through a check valve 18 and deliver the oil to a height $h$ above seat 12. Thus conduit 4 will be kept full of oil when the engine stops; and if valve 15 has seated due to a leak, a head of oil $h$ will act to keep valve 15 seated. In actual practice, however, I have found that this feature may be dispensed with and valve 18 omitted if valve 5 be properly designed.

If valve 5 is not built into the engine, nipple 8 should be of adequate strength or the valve should be otherwise supported so that there is no danger of a leak developing between conduit 4 and seat 12.

The invention may obviously be embodied in forms other than herein disclosed and hence the present disclosure is merely illustrative in compliance with the patent statutes and is not to be considered as limiting.

What is claimed is:

1. A fluid pressure system comprising a fluid passage adapted to receive fluid under pressure; mechanism operable by fluid pressure; a conduit connecting said mechanism with said passage; and a device for automatically closing communication between said passage and said conduit upon a predetermined total volume passing to said conduit in continued flow, said device comprising means responsive to substantially any degree of flow to said conduit.

2. In an internal combustion engine, a passage adapted to receive oil under pressure when the engine is in operation; a pressure gage; a conduit connecting the gage with said passage; a check valve operative to cut off communication between said passage and said conduit upon the occurrence of continued flow to said conduit, said valve comprising a seat and a valve element movable against said seat; and means to maintain a fluid seating pressure on the seated valve element after the engine has been stopped.

3. In an internal combustion engine, a passage adapted to receive a stream of oil; a check valve through which oil is delivered to said passage; a branch line communicating with said passage on the downstream side of said check valve; and a second valve positioned in the path of flow from said passage to said branch line, said second valve being movable toward its seat by the flow of oil to said branch line; said passage having its discharge point at a higher level than the position of said second check valve when seated.

4. In combination; a conduit; a valve seat over which flow to the conduit must pass; a valve element cooperative with said seat and movable toward it by minute rate of flow to said conduit, said valve element being normally positioned at a considerable distance from said seat; and means to exert on the valve element when moving a restraining force which increases as the speed of movement of the valve element increases.

5. In combination; a vertical casing substantially tubular in internal form and normally filled with liquid; means to close the bottom of said casing; a valve seat in an upper portion of said casing; means leading to a conduit above the valve seat; conduit means communicating with the interior of the casing between the valve seat and the bottom of the casing; a valve element normally positioned above said conduit means; a movement retarding wafer normally positioned near the bottom of said casing; and a filament connecting said movement retarding wafer with said valve element, said filament passing through and projecting beneath said wafer to prevent the wafer from striking the bottom of the casing.

6. A fluid pressure system comprising a fluid passage adapted to receive fluid under pressure; mechanism operable by fluid pressure; a conduit connecting said mechanism to said passage; and means responsive to the fluid flow for closing the conduit upon a predetermined total volume passing to said conduit in continued flow.

7. In combination; a conduit; a valve seat over which flow to the conduit must pass; a valve element cooperative with said seat and movable towards it by flow to said conduit, said valve element being normally positioned at a considerable distance from said seat whereby a relatively long movement of the valve is required to seat the same; and a dash pot operative to prevent said valve element from being seated by a sudden rush of fluid to said conduit.

8. In combination, a liquid reservoir normally filled with liquid, a movement retarding wafer normally positioned near the bottom of said reservoir, means to prevent said wafer from adhering to the bottom of said reservoir, a movable valve element spaced from said wafer, and means connecting said wafer with said valve element whereby the wafer retards movement of the valve element.

9. In combination; a conduit; a valve seat over which flow to the conduit must pass; a valve element cooperative with said seat and movable towards it by flow to said conduit, said valve element being normally positioned at a considerable distance from said seat whereby a relatively long movement of the valve is required to seat the same; means to force a liquid through said valve to said conduit; and a dash pot open to the liquid and at all times filled with such liquid, said dash pot being operative to prevent said valve element from being seated by a sudden rush of fluid to said conduit.

10. In combination; a conduit; a valve seat over which flow to the conduit must pass; a valve element cooperative with said seat and movable toward it by minute rate of flow to said conduit, said valve element being normally positioned at a considerable distance from said seat whereby a relatively long movement of the valve is required to seat the same; means to force a liquid through said valve to said conduit; and liquid controlled means to exert on the valve element when moving a restraining force which increases as the speed of movement of the valve element increases, said liquid controlled means being open to the liquid flow to said valve.

11. A fluid pressure system comprising a fluid conduit; means to deliver fluid to the conduit; and means for closing the conduit upon a predetermined total volume passing to said conduit in continued flow, said closing means being responsive to the quantity of fluid passing to the conduit and automatically returning to its initial condition upon each suspension of flow prior to the closing of the conduit.

12. In an internal combustion engine; a pressure gage; an oil line leading to said gage; means to force oil to the line; and means for closing the line upon the passage to the line in continued flow of a volume of oil substantially greater than the oil receiving volume of the line and gage, said closing means being responsive to the quantity of oil passing to the line and returning to its initial condition upon each suspension of flow prior to the closing of the line.

13. A fluid pressure system comprising a fluid pressure operated device; a fluid pressure conduit operatively connected to said device; means to force fluid under pressure to said conduit; and means for closing the conduit upon a predetermined total volume passing to said conduit in continued flow, said closing means being responsive to the quantity of fluid passing to the conduit and returning to its initial condition upon each suspension of flow prior to the closing of the conduit.

CHARLES F. CHISHOLM.